US012749275B2

(12) United States Patent
Michel et al.

(10) Patent No.: US 12,749,275 B2
(45) Date of Patent: Sep. 29, 2026

(54) DIRECT MANIPULATION OF IMPLICITLY DEFINED DIGITAL 3D SHAPES

(71) Applicant: Adobe Inc., San Jose, CA (US)

(72) Inventors: Élie Louis Simon Michel, Paris (FR); Valentin Deschaintre, London (GB); Mathieu Kevin Pascal Gaillard, San Jose, CA (US); Axel Florent Jacques Paris, Paris (FR); Adrien Kaiser, Lyons (FR); Marzia Riso, Rome (IT)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 18/672,648

(22) Filed: May 23, 2024

(65) Prior Publication Data

US 2025/0363758 A1 Nov. 27, 2025

(51) Int. Cl.
*G06T 19/20* (2011.01)

(52) U.S. Cl.
CPC ...... *G06T 19/20* (2013.01); *G06T 2219/2004* (2013.01); *G06T 2219/2021* (2013.01)

(58) Field of Classification Search
CPC ............. G06T 19/20; G06T 2219/2004; G06T 2219/2021
See application file for complete search history.

(56) References Cited

U.S. PATENT DOCUMENTS 11,734,890 B2 * 8/2023 Laine ........................ G06T 7/97 345/420
2009/0167763 A1 * 7/2009 Waechter ................ G06T 15/40 345/426
2016/0078662 A1 * 3/2016 Herman .................. A63F 13/10 345/473
2024/0104851 A1 * 3/2024 Narayana ............. G09B 29/007

FOREIGN PATENT DOCUMENTS

GB 2632508 A 2/2025

OTHER PUBLICATIONS

Gaillard et al, "Automatic Differentiable Procedural Modeling", 2022, Computer Graphics Forum (Year: 2022).*

(Continued)

*Primary Examiner* — YuJang Tswei

(74) *Attorney, Agent, or Firm* — Kilpatrick Townsend & Stockton LLP

(57) ABSTRACT

Techniques are disclosed for direct manipulation of implicitly defined digital three-dimensional (3D) shapes. In an example method, a computing device renders a 3D shape based on an implicit definition including one or more parameters. The computing device receives an indication of an input indicating a modification to the 3D shape at a point. The computing device determines an alternative representation of the point. The computing device determines a position of the point based on the alternative representation. The computing device determines a transformation that relates the position to the one or more parameters. The computing device determines a change in at least one parameter based on the transformation and the input. The computing device re-renders the 3D shape based on the implicit definition and the change in the at least one parameter. The re-rendered 3D shape includes the modification indicated by the input.

20 Claims, 7 Drawing Sheets

(56) References Cited

OTHER PUBLICATIONS

Schmidt et al, "Automatic Differentiation in Geometry Processing Made Simple", 2022, Eurographics (Year: 2022).*
Angles et al, "Sketch-Based Implicit Blending", 2017, ACM (Year: 2017).*
Sugihara et al, WarpCurves A Tool for Explicit Manipulation of Implicit Surfaces, 2010, Elsevier (Year: 2010).*
Angles, Baptiste, et al., "Sketch-Based Implicit Blending", ACM Transactions on Graphics (TOG), vol. 36, No. 6, Article 181, Nov. 2017, pp. 1-13.
Cascaval, Dan, et al., "Differentiable 3d Cad Programs for Bidirectional Editing", CoRR abs/2110.01182 (2021). arXiv preprint arXiv:2110.01182, Oct. 2021, pp. 1-14.
Gaillard, Mathieu, et al., "Automatic Differentiable Procedural Modeling", Computer Graphics Forum. vol. 41, No. 2, 2022, pp. 289-307.
Michel, Elie, et al., "Dag Amendment for Inverse Control of Parametric Shapes", ACM Transactions on Graphics (TOG), vol. 40, No. 4, Article 173, Aug. 2021 pp. 1-14.
Schmidt, Patrick, et al, "TinyAD: Automatic Differentiation in Geometry Processing Made Simple" Computer Graphics Forum, vol. 41, No. 5, Oct. 2022, pp. 113-124.
Schmidt, Ryan, et al., "Shapeshop: Sketch-Based Solid Modeling with Blobtrees.", ACM SIGGRAPH 2006 Courses, 2006, pp. 1-10.
Sugihara, Masamichi, et al., "A Sketch-Based Method to Control Deformation in a Skeletal Implicit Surface Modeler", In Eurographics Workshop on Sketch-Based Interfaces and Modeling, 2008, 8 pages.
Sugihara, Masamichi, et al., WarpCurves: A Tool for Explicit Manipulation of Implicit Surfaces Computers & Graphics, vol. 34, No. 3, 2010, pp. 1-11.
Zhang, et al, "A Hessian-Based Field Deformer for Real-Time Topology-Aware Shape Editing", SIGGRAPH Asia 2023 Conference Papers (SA '23), 114, available at https://doi.org/10.1145/3610548.3618191, see Sections 3.1-3.4, figs. 4, 8, arXiv:2405.07644v1, May 13, 2024, pp. 1-11.
GB Application GB2502116.3, Combined Search and Examination Report Mailed on Sep. 16, 2025, 8 pages.

* cited by examiner

DIRECT MANIPULATION OF IMPLICITLY DEFINED DIGITAL 3D SHAPES

TECHNICAL FIELD

This disclosure generally relates to editing three-dimensional (3D) graphics and, more specifically, to techniques for direct manipulation of implicitly defined digital 3D shapes.

BACKGROUND

High-quality, resolution-independent computer graphics can be generated using procedural methods. Procedural methods can involve, for example, using algorithms to automatically generate detailed and scalable content based on mathematical formulae and rules. Due to their compact representation, a variety of procedurally generated graphics can be efficiently generated by manually editing exposed procedural parameters. Obtaining a desired graphic can involve experimentation to determine the value of the procedural parameters, often through manipulation of user interface controls such as sliders whose position corresponds to the value of the procedural parameters.

Some procedural methods may use implicitly defined shapes. An implicitly defined shape can include shapes that are defined using a mathematical constraint on which points in space belong to the shape. The constraints may be parameterized and adjusted using sliders. For example, a number of 3D shapes can be implicitly defined using parameterized definitions and then combined using procedural methods to generate a composite 3D shape. Sliders can be used to adjust the parameters to cause redrawing of one or more of the constituent 3D shapes to obtain the desired 3D composite shape.

SUMMARY

Some embodiments described herein relate to techniques for direct manipulation of implicitly defined digital 3D shapes. In one general aspect, a method performed by one or more processing devices may include rendering, on a display device, a 3D shape based on an implicit definition of the 3D shape, where the implicit definition may include one or more parameters; receiving an indication of an input, where the input indicates a modification to the 3D shape at a point; determining an alternative representation of the point; determining a position of the point based on the alternative representation; determining a transformation that relates the position to the one or more parameters; determining a change in at least one parameter of the one or more parameters based on the transformation and the input; and re-rendering the 3D shape based on the implicit definition and the change in the at least one parameter, where the re-rendered 3D shape includes the modification indicated by the input. Other embodiments of this aspect include corresponding computer systems, apparatus, and computer programs recorded on one or more computer storage devices, each configured to perform the actions of the methods.

In one general aspect, a system may include one or more processors. The system may also include one or more computer-readable storage media storing instructions which, when executed by the one or more processors, cause the one or more processors to perform operations including: rendering, on a display device, a 3D shape based on an implicit definition of the 3D shape, where the implicit definition may include one or more parameters; receiving a selection on a first area on the 3D shape, the first area including one or more points; for each point of the one or more points: determining a coparametrization value of the point; determining a position using an end-to-end differentiable position evaluation. The operations may furthermore include determining, based on the position, Jacobian information for the position with respect to the one or more parameters. The operations may in addition include generating a Jacobian matrix based on the Jacobian information for the positions for the one or more points. The operations may moreover include receiving an indication of a stroke beginning at the first area and ending at a second area. The operations may also include determining an update to at least one of the one or more parameters based on the stroke and the Jacobian matrix; and re-rendering the 3D shape based on the implicit definition and the update to at least one of the one or more parameters. Other embodiments of this aspect include corresponding computer systems, apparatus, and computer programs recorded on one or more computer storage devices, each configured to perform the operations.

In one general aspect, a non-transitory computer-readable medium stores instructions that, when executed by one or more processors, cause the one or more processors to perform operations including may include rendering, on a display device, a 3D shape based on an implicit definition of the 3D shape, where the implicit definition may include one or more parameters; receiving an indication of an input, where the input indicates a modification to the 3D shape at an area on the 3D shape having one or more points; a step for determining a coparametrization of one or more points, the coparametrization having one or more coordinates and an identifier; a step for determining a position for each coparametrizations of the one or more points; a step for determining Jacobian matrices that relate the coparametrization to the one or more parameters; a step for determining a change in at least one parameter of the one or more parameters based on the Jacobian matrices and the input; and re-rendering the 3D shape based on the implicit definition and the change in the at least one parameter, where the re-rendered 3D shape includes the modification indicated by the input. Other embodiments of this aspect include corresponding computer systems, apparatus, and computer programs recorded on one or more computer storage devices, each configured to perform the operations.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

Figure 1:
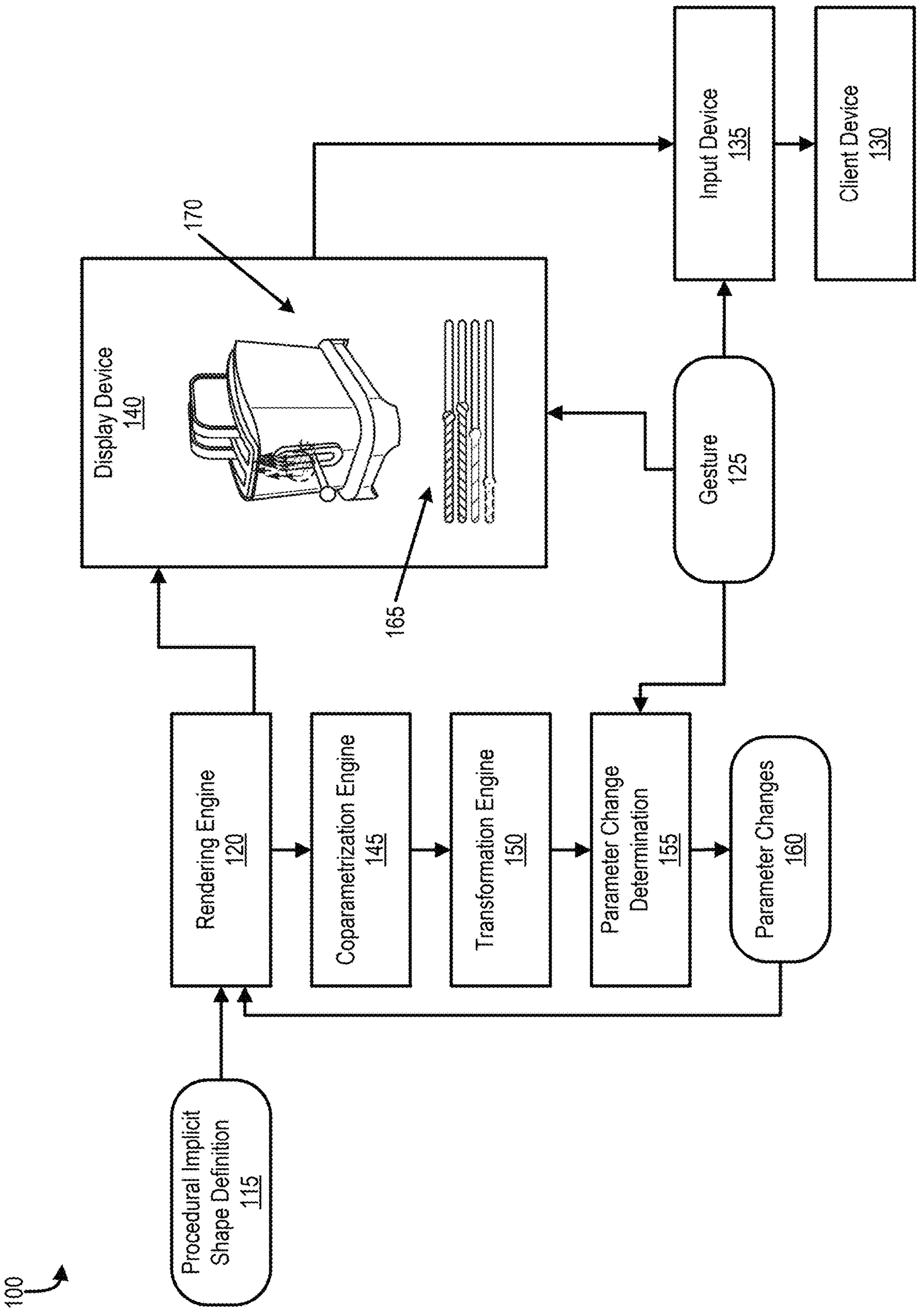
FIG. 1 is a diagram of an example system implementing techniques for directly manipulating implicitly defined digital 3D shapes, according to some aspects of the present disclosure.

DETAILED DESCRIPTION 3D digital computer graphics can be constructed from shapes, sometimes called 3D primitives. For example, a complex, composite 3D shape may be constructed from a collection of simpler 3D primitives such as spheres, cubes, prisms, and so on. The simpler 3D primitives can be combined, manipulated, and transformed using operations like translations, rotations, and scaling to create detailed and intricate 3D models.

For operations involving 3D primitives in a computing system, an internal representation of the 3D primitives can be used. The internal representation may include information such as the location of the 3D primitives in a suitable coordinate system, properties of the 3D primitives, relationships with other 3D primitives, specification of textures, and so on.

The internal representation of a 3D primitive may include a mathematical description of the 3D primitive. The mathematical description of the 3D primitive may be an explicit definition including parameterized enumerations of specifications of points, lines, or shapes associated with the primitive. For instance, a 3D sphere may be described using an array of 3D coordinates defining a "mesh" that is the surface of the sphere. On the other hand, the mathematical description of the 3D primitive may be an implicit definition. An implicit definition of a 3D primitive is one that specifies the surface or other characteristics of a 3D shape using parameterized mathematical formulae or algorithms. For instance, a 3D sphere may be described using a mathematical equation that defines a sphere in 3D space. In this example, the radius of the sphere may be a parameter.

Assembly of a number of 3D primitives into a composite 3D shape can involve a procedural method. A procedural method can be used to assemble the composite 3D shape from a number of 3D primitives through a series of steps or algorithms. Use of a procedural method to assemble a composite 3D shape may result in a more compact, efficient representation than explicit descriptions of combined 3D primitives. Once 3D primitives have been combined using a suitable procedural method, the composite 3D shape can be manually further edited using a set of exposed parameters to fine-tune the assembled 3D shape. Such a 3D shape can be described as a parameterized composite 3D shape.

One example of a procedural method that can be used for assembling explicitly or implicitly defined 3D primitives to construct composite 3D shapes is known as a directed acyclic graph (DAG). In one example of constructing a 3D shape using a DAG, each node in the DAG may represent the instantiation of a 3D primitive or an operation or transformation applied thereto, such as the union of two or more 3D primitives or the translation of one or more 3D primitives. The DAG edges can define the flow or logical ordering of these operations, enabling the composition of complex, composite 3D shapes from simpler 3D primitives through a hierarchical and non-circular structure of dependencies.

In some examples, the 3D primitives used in a procedural method are implicitly defined. In some examples, an implicitly defined 3D primitive can be defined using a mathematical function that assigns a value to each point in space. A subset of the points thus assigned can be designated as part of the 3D primitive or on the surface of the 3D primitive. In some examples, 3D primitives can be implicitly defined using signed distance functions (SDFs). In one example approach using SDFs, the 3D primitive can be defined as the locus of points at which a particular mathematical function's value is zero. An SDF is an example of a type of implicit mathematical definition that effectively assigns to every point in space a value equal to the shortest distance to the shape. The sign of the value can indicate whether the point is inside or outside the shape.

For example, a 3D sphere centered at the origin can be described using the SDF $$SDF_{sphere} = \sqrt{x^2 + y^2 + z^2} - r,$$

in which (x, y, z) are the coordinates of a point in 3D space in the coordinate system of the 3D primitive and r is a parameter constraining the radius of the 3D sphere. The coordinate system of the 3D primitive is sometimes referred to as the canonical coordinate system of the 3D primitive. In this formulation, the value of the SDF function corresponds to the distance from any point in space to the surface of the sphere, in which positive values are outside the sphere, negative values are inside the sphere, and zero corresponding to locations on the surface of the sphere. An implicitly defined 3D spherical surface, as used in a procedural method such as a DAG, could be defined as a set of points for which the equation $$0 = \sqrt{x^2 + y^2 + z^2} - r$$

is satisfied.

Some existing approaches to editing of parameterized composite 3D shapes generated using a procedural method such as a DAG enable users (e.g., graphic artists) to edit composite 3D shapes using a suitable user interface (UI). For example, a UI may enable users to adjust sliders whose position is proportional to the value of a corresponding parameter found in an explicit or implicit definition of one of the constituent 3D primitives. In some other examples, a UI may enable users to input a gesture or stroke to directly indicate a desired edit to the 3D shape. Such direct manipulation may be effective to modify composite 3D shapes that are explicitly defined.

However, this method of directly manipulating the 3D shape cannot be directly applied to composite 3D shapes assembled from implicitly defined 3D primitives. This is because existing methods for identifying the element of a 3D surface targeted by a direct manipulation may rely on the explicitness of the edited 3D shape. For example, existing approaches for direct manipulation of procedurally generated explicit 3D shapes rely on metadata or other additional information associated with the vertices, faces, or corners of the 3D shapes during generation. The metadata or other additional information thus stored can be used to facilitate direct manipulation. On the other hand, implicitly defined shapes may lack any comparable capability to include metadata or other additional information in a similar manner. The DAG used to generate the implicitly defined 3D shape must therefore be augmented with additional information as is described below.

Additionally, the methods for tracking a point on the surface of a 3D shape as the shape evolves may vary significantly between implicitly defined and explicitly defined 3D shapes. Likewise, existing methods also lack a technique for establishing a connection between a geometrical update of a 3D shape and the corresponding parameter update for procedural implicit shapes. As a result, it may not be possible to relate the desired edit to the evolution of any exposed parameters.

At the same time, obtaining the desired composite 3D shape may be time-consuming, particularly when it involves experimentation to find the optimized value for each exposed procedural parameter. Such experimentation may involve, for example, tedious tweaking of sliders that are proportional controls for the exposed parameters or other manual interactions with the UI. Thus, even in cases where the manual tweaking of the exposed parameters may be used for editing the composite 3D shape, direct manipulation of the composite 3D shape may still be preferable. However, as already mentioned, direct manipulation may not be possible when the constituents of the composite 3D shape are implicitly defined 3D primitives.

Techniques for direct manipulation of implicitly defined digital 3D shapes are disclosed to address these challenges. In an illustrative method, a computing system renders, on a display device, a composite 3D shape based on an implicit definition of the composite 3D shape. The implicit definition may be a combination of one or more SDFs, each of which may include a number of parameters. For example, the implicit definition of the composite 3D shape may be the union of two 3D primitives implicitly defined using parametrized SDFs. In this example, the two 3D primitives may be a sphere and a cylinder, and the cylinder may be protruding from the sphere (e.g., a composite lollipop shape). The SDFs characterizing the two 3D primitives may be parameterized with a number of parameters included as constants in the defining SDFs. For example, the parameters can define the radius of the sphere, the radius of the cylinder, the height of the cylinder, the position of the sphere, or the position of the cylinder, among other possibilities.

The computing system receives an indication of an input that can indicate a desired modification to the composite 3D shape at a point. For example, the composite 3D shape may be displayed on a touch-enabled user interface, such as a tablet screen, configured for direct manipulation of the composite 3D shape by a user (e.g., a graphic artist). The input can involve the user touching the rendered composite 3D shape with a finger and dragging the shape in a desired direction of manipulation. In the lollipop example mentioned above, the user may touch the end of the cylinder protruding from the sphere and drag the end of the cylinder away from the sphere, intending to cause the cylinder to be lengthened. Or the user may touch the surface of the sphere and drag outwards from the center of sphere, intending to cause the radius of the sphere to grow.

In existing systems, such a manipulation could be performed using sliders with positions proportional the values of the parameters used to define the composite 3D shape. As described above, however, manipulation of the sliders may be counterintuitive or involve undesirable experimentation. In some examples, and in particular complex examples with numerous parameters, it may not even be clear which slider or sliders need to be manipulated to achieve the desired transformation. The innovations of the present disclosure enable the user to simply manipulate the 3D shape directly independently of the sliders, or indeed, without any knowledge of the parameters at all, including in cases in which the composite 3D shape includes implicitly defined 3D primitives.

To accomplish these and other aims of the present disclosure, the computing system first determines an alternative representation of the point. For example, one alternative representation of the point is known as a "coparametrization." The coparametrization can be used to characterize points on the composite 3D shape before and after editing using certain unchanging, uniquely identifying identifiers. In some examples, the coparametrization for each point can be determined while the composite 3D shape is being rendered, which can reduce the computational load on the computing system during direct manipulation of the composite 3D shape.

The computing system then determines a position of the point based on the alternative representation. In some examples, the coparametrization of the point is converted into a 3D coordinate in the coordinate system of the rendered composite 3D shape using a position evaluation function. In some examples, like the coparametrization, the position for each point is determined while the composite 3D shape is being rendered. The computing system then determines a transformation that relates the position to the one or more parameters. The transformation may be, for example, a Jacobian matrix. The Jacobian matrix is a mathematical operator that can output small changes to the geometry of the composite 3D shape in response to small changes in the parameters. These small changes are sometimes referred to as differentials. The Jacobian operator thus relates spatial rates of change of the 3D components of the position to the rate of change of the parameters in parameter space.

The computing system next determines a change in at least one parameter of the one or more parameters based on the transformation and the input. For example, the Jacobian matrix can be used to compute an update to at least one of the parameters that is consistent with the user input. In other words, the computing system can determine a change in value of at least one parameter of the one or more parameters that would produce the manipulation of the 3D shape indicated by the user input using the computed Jacobian matrix.

In some examples, a number of points in the vicinity of the selected point is sampled to improve the accuracy of the resulting parameter changes and to better gauge the user's intent. In that case, a Jacobian matrix can be similarly obtained for each selected point. The Jacobian matrices thus computed can be combined and filtered to obtain a single, reduced Jacobian matrix to limit the number of parameters affected by the stroke-based edit as well as to improve computational efficiency by using only the most significant components of the combined and filtered Jacobian matrix. Changes to the parameter values can then be computed using the reduced Jacobian matrix.

The computing system re-renders the 3D shape based on the implicit definition and the change in the at least one parameter, in which the re-rendered 3D shape includes the modification indicated by the input. For example, once the user input is complete (e.g., a mouse button is released or a finger is lifted from a touchscreens shape), the parameters can updated according to the computed change and the composite 3D shape can be re-rendered using the updated values of the one or more parameters. In some examples, the user interface is configured to re-render the composite 3D shape in near-real-time such that the composite 3D shape appears, to the user, to be modified in real-time based on the user input using the method described above.

The techniques disclosed herein for directly manipulating implicitly defined digital 3D shapes constitute improvements to the technical field of 3D graphics editing as well as the mathematical infrastructure that enables effective 3D graphics editing by non-mathematically-inclined users. As described above, existing systems involving the editing of parametrized, implicitly defined 3D shapes are limited to inputs involving user interface controls such as sliders whose utility falls off quickly when 3D shapes become complex. For complex 3D shapes, the ability to directly manipulate 3D shape using intuitive gestures such as "select-and-drag" inputs is preferable to the indirect manipulation of the 3D shape using sliders in almost all cases. For example, direct manipulation is faster, more intuitive, more error-tolerant, and more accessible to a larger number of users. Moreover, the innovations described herein go well beyond automation of conventional activity and are directed to a specific improvement in 3D graphics editing. The use of coparametrization and the Jacobian operators, for example, constitute an improvement to 3D graphics editing for manual and computer-based existing approaches.

The techniques disclosed herein can also improve the functioning of computers used for 3D graphics editing. Since user inputs can now more closely map to the actual intent of users, the consumption of computational resources can be reduced since fewer iterations are required to accomplish desired edits. For example, since experimentation with opaquely defined slider values is no longer required, fewer processing resources are needed to accomplish he same intended edit. Computational resources can likewise be conserved because the techniques enable the direct manipulation of implicitly defined 3D shapes, whose definitions are inherently simpler that comparable explicitly defined 3D shapes. Thus, implicit definition can now be used in a larger number of use cases where direct manipulation is required or desired, thus reducing the overall consumption of computing resources previously required due to in-memory and persisted storage of complex, explicitly defined 3D shapes.

Overview

FIG. 1 is a diagram of an example system 100 implementing techniques for directly manipulating implicitly defined digital 3D shapes, according to some aspects of the present disclosure. Example system 100 includes a shape modification system 110. Shape modification system 110 may be, for example, a component of a 3D graphics editing platform that includes components for designing, editing, and rendering 3D shapes and other 3D graphics. The shape modification system 110 may be implemented using program code executing on a computing system that is local to the user, on a remote server, in a cloud-based execution environment, or a combination thereof.

For instance, the shape modification system 110 may be executing on a client device 130 such as laptop computer executing 3D graphic editing software using a combination of program code executing in both software and hardware components of the laptop. In FIG. 1, client device 130 is depicted as part of the shape modification system 110. In some implementations, the client device 130 may be a component that is external to the shape modification system 110. In that case, the shape modification system 110 may be accessed according to a client/server model using, for instance, a suitable application programming interface (API).

Shape modification system 110 includes rendering engine 120. The rendering engine 120 can render a composite 3D shape based on a parametrized, implicit definition of the composite 3D shape. The rendering engine 120 may, for example, receive a procedural implicit shape definition 115 from another component of the 3D graphics editing software. The procedural implicit shape definition 115 may be, for example, a composite 3D shape definition that includes one or more analytical SDFs corresponding to a number of parametrized 3D primitives or transformations thereto. The analytical SDFs can define 3D shapes as the "zero-level set" of a function or the collection of points that satisfies the condition $f(x, y, z)=0$ for each 3D primitive. The composite 3D shape can be a combination of 3D primitives thus defined. In general, parameters can be chosen to characterize various aspects of the geometry of the composite 3D shape, such as orientation angles, rotation angles, scaling factors, offset distances, curvature adjustments, tapering degrees, sphere eccentricity, wall thickness, and so on.

In some examples, the implicitly defined 3D primitives are combined using a procedural function. The procedural function may be, for example, a DAG although other representations can be used to describe the 3D primitives. Other representations may include, for example, procedural shapes expressed as a "stack of operations." In this approach, each element in the stack corresponds to an operation that modifies a 3D primitive.

The DAG may specify a number of implicitly defined 3D primitives or other implicitly defined 3D shapes, which can then be combined using a series of transformation operations such as unions, intersections, scaling, rotations, translations, and so on. The DAG may include nodes and edges that indicate a logical sequencing of the various transformation operations.

The client device 130 can receive an indication of an input that indicates a desired modification to the 3D shape at a particular point or area. The input may be, for example, a gesture 125 input using an input device 135. The input device 135 may be a mouse, trackpad, joystick, or any other suitable input device 135 for providing an indication of a desired modification to a 3D shape displayed on display device 140. In some examples, the input is received from the display device 140 itself if the display device 140 also functions as a touchscreen input device 135.

Display device 140 may be a display connected to a laptop, an external monitor, television, remote or network display, or any other suitable device or method for displaying the rendered 3D shape. FIG. 1 depicts display device 140 showing an example rendered 3D shape 170 (a toaster) along with example sliders 165 for manipulating the parameters used to implicitly define the rendered 3D shape 170. The appearance of rendered 3D shape 170 and associated user interface elements as shown on display device 140 may vary significantly among implementations, and in particular from the example shown for illustrative purposes in FIG. 1.

Shape modification system 110 includes coparametrization engine 145 that can be used for determining an alternative representation of a point. For example, the coparametrization for points on the rendered composite 3D shape can be evaluated simultaneously with the determination of or rendering of the implicitly defined 3D shape. For instance, the coparametrization may be determined during the rendering of the composite 3D shape as specified by a DAG. In some other examples, the coparametrization can be determined upon selection of the point or points via the user input or gesture 125. The coparametrization may be, for example, a bijective mapping between points on the composite 3D shape, as constrained by the currently selected parameters, and unique identifiers for the implicitly defined parametric 3D primitives.

The coparametrization may be a collection of information that uniquely identifies points on the composite 3D shape that are invariant under transformations of the composite 3D shape. For example, the coparametrization $c_i$ of a point $p_i$ may be made up of two components (a, pid) corresponding to the "canonical" coordinates of an implicitly defined 3D primitive and a unique identifier denoted as pid. The pid value may, for example, correspond to a particular sequence of operations in the procedural function used to render the composite 3D shape.

Shape modification system 110 includes transformation engine 150 that can be used for determining a position of the point based on the coparametrization. For example, the transformation engine 150 can determine the position of the point in the 3D coordinates of the composite 3D shape by inverting the bijective mapping C between the points on the composite 3D shape and the coparametrization. The transformation engine 150 can also determine a transformation that relates the position to the one or more parameters. For example, the transformation may be a differential operator such as a Jacobian operator or matrix that relates spatial rates of change of the 3D components of the position to the rate of change of the parameters in parameter space.

Shape modification system 110 includes a parameter change determination component 155 that can be used for determining a change 160 in at least one parameter based on the transformation and the input. For example, the Jacobian matrix can be inverted and multiplied by a representation of the user input or gesture 125, such as a scalar magnitude, to compute a change 160 to one or more parameters that is consistent with the user input. In some examples, a number of points are selected in addition to the points selected by the user. For instance, a number of points may be sampled within a brush extent defined in the user interface. In that case, a Jacobian matrix can be computed for each point. The Jacobian matrices thus determined can be averaged, filtered, and reduced by parameter change determination component 155 to select the most significant contributors to the parameter updates.

Rendering engine 120 can then re-render the 3D shape based on the implicit definition and the change 160 in the at least one parameter. For example, the parameter change determination component 155 may determine one or more scalar change 160 or changes to the one or more parameters and apply them to the one or more parameters. The application of these updates may have an effect similar to applying a change to the parameters using, for example, slider controls. The re-rendered composite 3D shape can reflet the modification indicated or intended by the user input.

Procedural Generation of 3D Shapes

Figure 2A:
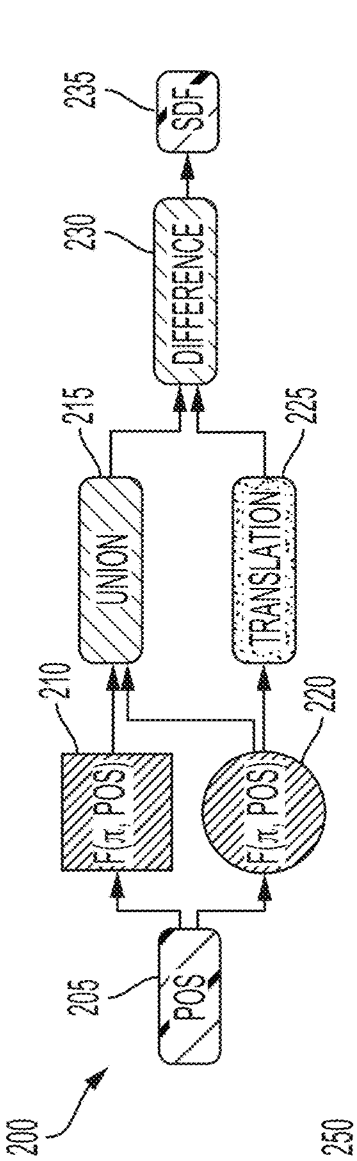
FIGS. 2A-2C depict example directed acyclic graphs that may be used for rendering of and performing various computations in relation to composite 3D shapes that are made up of one or more implicitly defined 3D primitives, according to some aspects of the present disclosure.
Figure 2B:
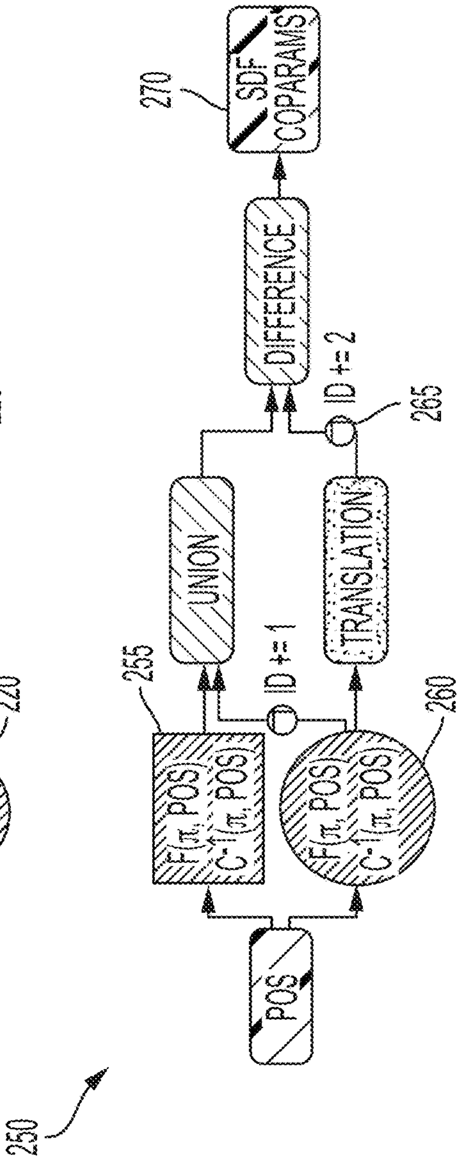
Figure 2C:
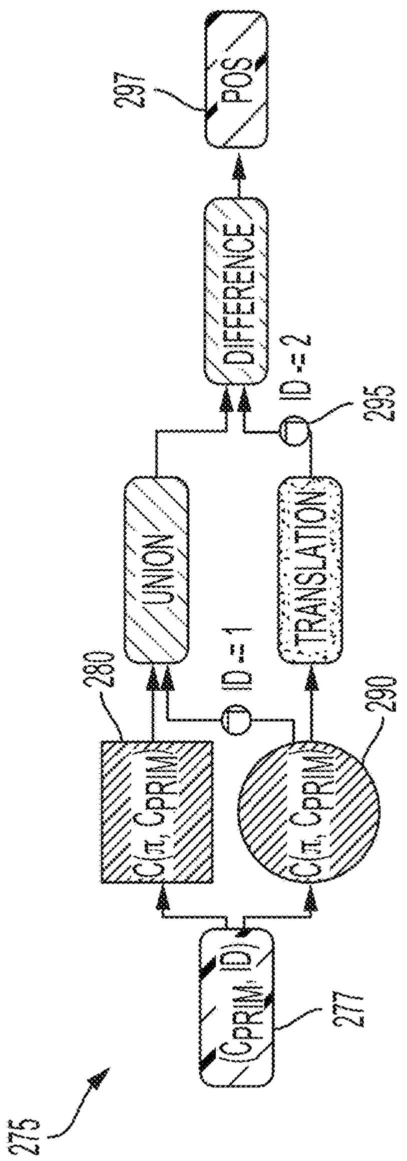

FIGS. 2A-2C depict example DAGs 200, 250, 275 that may be used for rendering of and performing various computations in relation to composite 3D shapes that are made up of one or more implicitly defined 3D primitives, according to some aspects of the present disclosure. FIG. 2A shows DAG 200 that can be used, for example, to determine whether each point 205 in the coordinate system for the composite 3D shape, or a suitable subset thereof, is or is not on the composite 3D shape. In other words, DAG 200 can be used to render the composite 3D shape when it is implicitly defined using, for example, SDFs.

The nodes 210, 220 can correspond to simpler implicitly defined 3D primitives that are transformed or combined together via Boolean operations to make the composite 3D shape. For example, nodes 210, 220 correspond to a cube and sphere, respectively. Nodes 210, 220 can thus represent the value of the SDF for the point 205 and a particular set of parameters. The SDFs from nodes 210, 220 can then be subject to various transformations from constructive solid geometry (CSG) such as unions, differences, or intersections. Other operations, such as translations, scaling, rotations, etc. are also possible. For example, at 215 the SDFs from nodes 210, 220 are combined using a union operation to a make a composite 3D shape. CSG operations such as the union operation can be implemented by combining the SDFs from nodes 210, 220 using suitable mathematical operators such as the min or max operators. At 225, the SDF corresponding to the sphere at node 220 is translated. At 230, the composite 3D shape from the union 215 and the translated sphere 225 are combined in a difference operation 230. In some cases, transformation of the canonical coordinate system used in each primitive's SDF at nodes 210, 220 may be performed. For example, the translation operation 225 may involve translating the canonical coordinate system of the sphere 220 prior to the difference operation 230. The output node 235 for DAG 200 can return the distance value from the shape isoline (e.g., the solution to zero-valued equation of the SDF) for the composite 3D shape evaluated at a sampled point. The SDF of the composite 3D shape evaluated at 235 may be a parameterized combination of the SDFs of the 3D primitives instantiated at nodes 210, 220.

FIG. 2B shows DAG 250 that is laid out similarly to DAG 200. However, DAG 250 output 270 is enriched in that it includes both the distance value from the shape isoline as well as the coparametrization for each point the DAG is evaluated on. The DAG 250 may be used in parallel with or lieu of DAG 200, according to the desired output. The coparametrization may include a first component a that is the representation of a 3D point location in the canonical coordinates of the primitives at nodes 210, 220. The coparametrization may include a second component, the pid component that can be initialized with a pid=0 value at point 205. The pid can be updated while the DAG 250 is traversed. In this respect, the pid can represent a unique identifier for the path from a source node of the DAG 250 to a sink node of the DAG 250 that is followed.

In some examples, all possible paths in the DAG 250 are enumerated by updating the pid component for all operations that involve more than a single primitive, such the Boolean CSG operations. For example, given an operation with n input components in which each input component includes coparametrization values (a, pid) for each point, the pid of each ith input component is incremented by a quantity equal to one plus the maximum pid from among all paths that reach the ith input component from each input component j such that j<i, where there are j other input components besides the ith input component. An input component may be an input primitive (e.g., the cube or sphere of nodes 210 and 220) as well as a composite 3D shape generated by a DAG operation, such as the output of union 215. This sum can be formally expressed as $\Sigma_{j<i}$ paths$_j$. This can be implemented in DAG 250, for example, by including an incrementing node 265 before every operation that involves more than a single input component. Use of incrementing node 265 can ensures that every path is uniquely identified by a pid value such that it is possible to identify the sequence of operations that resulting a particular coparametrization.

FIG. 2C shows DAG 275 that is again laid out similarly to DAG 200. However, DAG 250 output 297 is enriched in that it can include the 3D coordinates in the coordinate system of the composite 3D shape given an input coparametrization value 277. DAG 275 in effect replicates the exact behavior of DAG 250 in reverse and sometimes referred to as a "position evaluation function." Given coparametrization 277, its canonical coordinates component a can be evaluated for each primitive in the DAG 275 at nodes 280, 290. The canonical coordinates component a can then be propagated to downstream operations as above. The canonical position can be transformed and propagated again for every transformation node encountered.

DAG 275 includes a decrementing node 295. The operations such as the CSG operations and geometric transformation operations among input components such as primitives and intermediate composite components can be performed as above with respect to DAG 250. The pid component, calculated in the same way as for DAG 250, can be subtracted from the pid component input at 277. In some cases, the output of more than one transformation node may correspond to a given path. If the result of decrementing the pid for a particular output is a zero-valued pid, then that output is propagated to the next node. If no coparametrization has a pid value equal to zero, then a node default strategy can be selected to determine which output will be propagated to the next node. By construction, the final output coparametrization 297 will have a zero-valued pid component. The output 297 will thus include a position in the coordinates of the composite 3D shape corresponding to the input coparametrization 277.

Coparametrization

Figure 3:
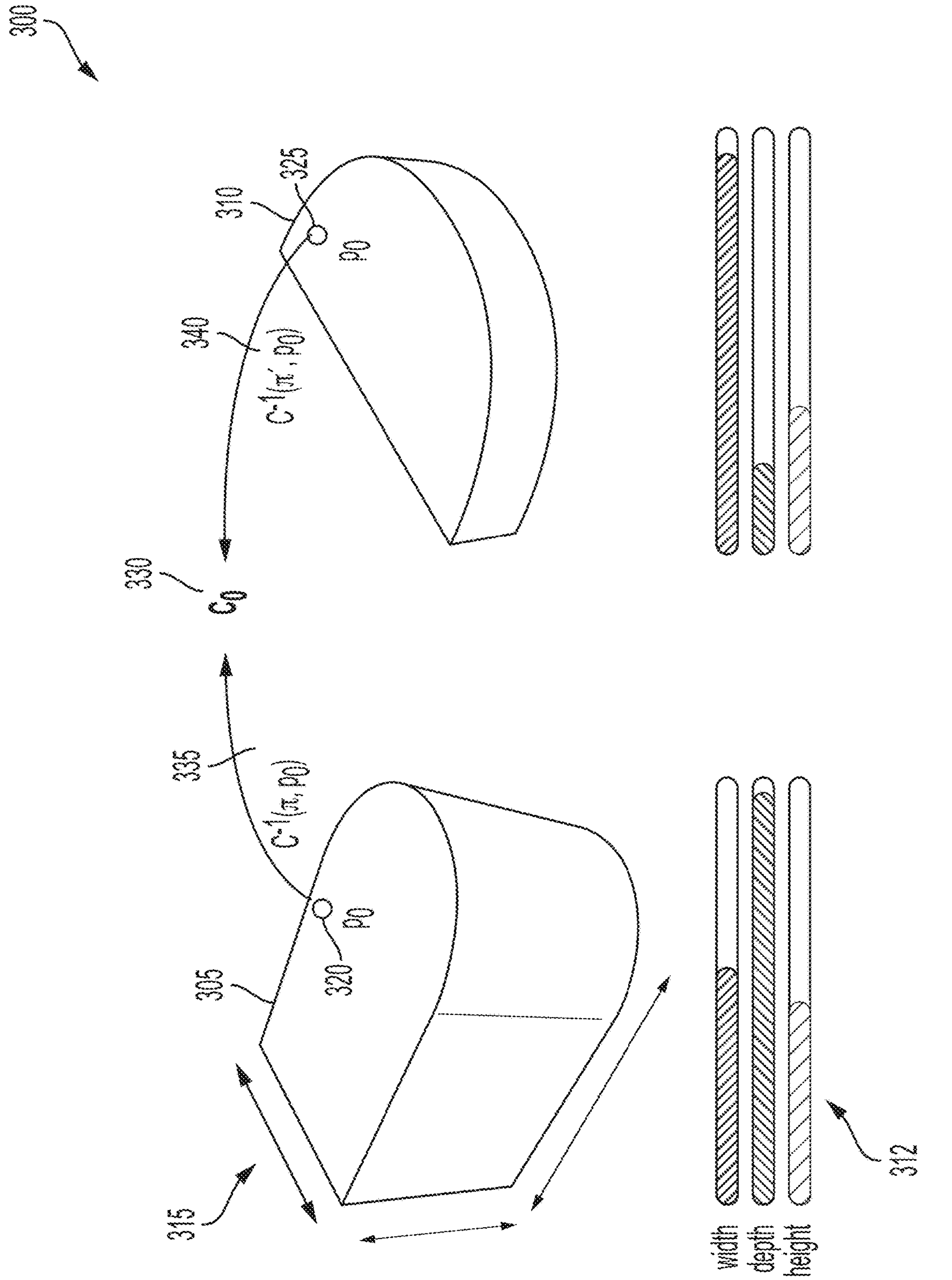
FIG. 3 depicts an example of coparametrization, according to some aspects of the present disclosure.

FIG. 3 illustrates one example of an alternative representation that may be used to uniquely represent points on the surface of the 3D primitives used to assemble composite 3D shapes. In particular, FIG. 3 depicts an example of coparametrization 300, according to some aspects of the present disclosure.

Formally, parametric 3D shapes can be defined as analytical SDFs that are defined as the zero-level set of a field function $f:\mathbb{R}^N \rightarrow \mathbb{R}$. In particular, a family of procedural 3D shapes can be defined as $\varphi: \Pi \rightarrow \mathcal{S}$, where each asset $s \in \mathcal{S}$ is generated using the corresponding parameter values $\pi \in \Pi$.

The direct manipulation of a composite 3D shape is enabled using a stroke-based interface. For example, the user artist can express a local manipulation $\Delta s$ of the shape S in the brush extent. The user may have a subjective intent associated with the local manipulation. Since the final appearance of the shape S is governed by the values $\pi$ of the one or more parameters, the techniques of the present disclosure can be used to determine an update $\Delta\pi$ such that the composite 3D shape, when updated using $\Delta\pi$, results in generation of a re-rendered composite 3D shape instance that may match the intent of the user providing the input.

This problem can be formalized as inverting the function $\Phi$ in order to find the actual parameter values that match the desired shape based on the user input indicated by the user. This can be written formally as $\Phi^{-1}(S+\Delta S) \rightarrow \pi+\Delta\pi$. To measure the impact of the user input on the parameters, a method for detecting how a given point changes according to an update in the parameters can be used. However, an implicitly defined 3D shape relies on the evaluation of the distance between each point location and the isoline of the shape itself. Unlike the case when using an explicitly defined 3D shape (e.g., a mesh representation), it may not be possible to describe the isoline using uniquely identifiable points. The coparametrization method described below can enable the determination of a unique identifier for each point on the surface of the composite 3D shape which can be used to estimate the influence of the updated parameters.

Coparametrization example 300 includes two 3D shapes, 305 and 310 as may be rendered in the user interface of 3D graphics editing software. In traditional systems, 3D shape 310 can be generated using 3D shape 305 as a starting point using the sliders 312 to adjust the parameters 315. 3D shape 310 may be said to be "evolved from" 3D shape 305. For instance, the 3D shape 310 has a smaller depth, smaller height, and larger height than 3D shape 305. Similar behavior may be exhibited, in this respect, for cases in which shapes 305, 310 are defined explicitly or implicitly.

Considering in particular the case in which shapes 305, 310 are defined implicitly, the shapes 305, 310 can be generated by the same implicit function (e.g., an SDF) using two different sets of parameters. 3D shape 310 can be generated using 3D shape 305 as a starting point by evolving the parameters defining 3D shape 305 to the parameters defining 3D shape 310. A point 320 selected on the surface of 3D shape 305 can have a corresponding point 325 on the surface of evolved 3D shape 310. However, the 3D coordinates of the points 320, 325 with respect to a fixed coordinate system may differ even though they correspond to the same point on the evolved surface. As a result, it can be difficult to determine a mathematical relationship between a changing point and the influence of the parameters on that point. The coparametrization 300 can be used to determine a value unique to each point on the surface of the 3D shapes 305, 310 that is invariant under parameter transformations.

The coparametrization 300 can be defined as a bijective mapping $C: \mathbb{R}^3 \rightarrow \mathbb{R}^n$, such that given a position $p_i$ of a point it returns the corresponding coparametrization 300 $c_i$ evaluated according to the current parameter values. In some examples, the coparametrization 300 for each 3D point is computed as the SDF which is computed as described above with respect to FIG. 2B. In FIG. 3, the bijective mapping 335 maps point 320 $p_0$ to coparametrization 330. Likewise, the bijective mapping 340 maps point 325 $p_0$ to coparametrization 330. The notation $C(\pi, c_i)$ denotes a mapping between a point $p_i$ and a coparametrization $c_i$, in which the point $p_i$ is constrained by the hyperparameter $\pi$.

For example, the coparametrization $c_i$ of a point $p_i$ may be made up of two components (a, pid). The first component, $\alpha$, may be a 3D real-valued coordinate. The coordinate may use the canonical coordinates of the corresponding implicitly defined 3D shape 305, 310. In this respect, the canonical coordinates may refer to the coordinate system that each implicitly defined 3D shape 305, 310 is defined with respect to. For instance, some implicitly defined 3D shapes may be based on an SDF given in untranslated (i.e., centered at (0,0,0)) Cartesian coordinates. The canonical coordinates refer to the coordinates associated with each SDF, which may differ from the coordinate system of the composite 3D shape. The second component may be an integer value pid, which, together with the canonical coordinate value, uniquely defines the point 320, 325. The pid value may, for example, correspond to the particular sequence of operations in the procedural function used to render the composite 3D shape. Other values for the pid may be used in various examples, however. In some examples, the coparametrization 300 includes additional or alternative values or methods for determination.

Transformation

Figure 4C:
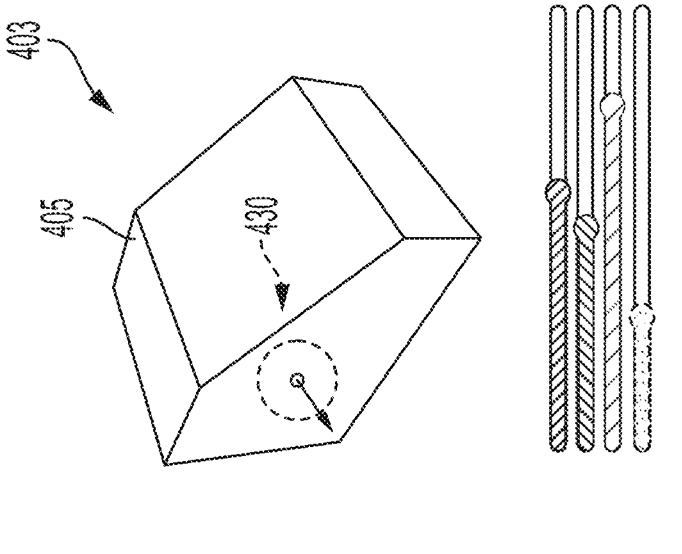
FIGS. 4A-4C illustrates one example of determining a transformation that relates a computed position to the one or more parameters, according to some aspects of the present disclosure.
Figure 4B:
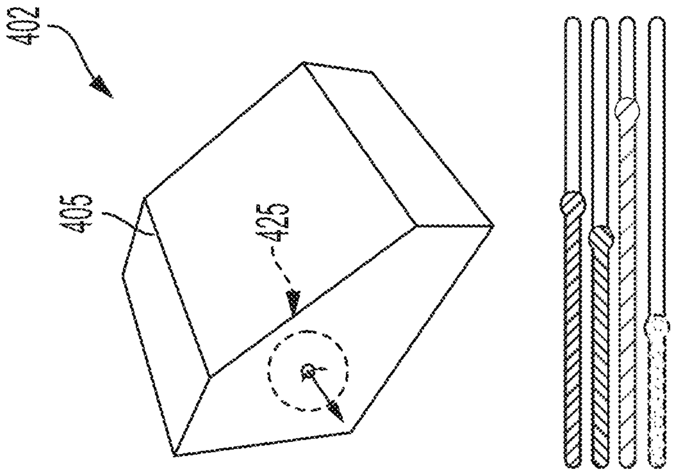
Figure 4A:
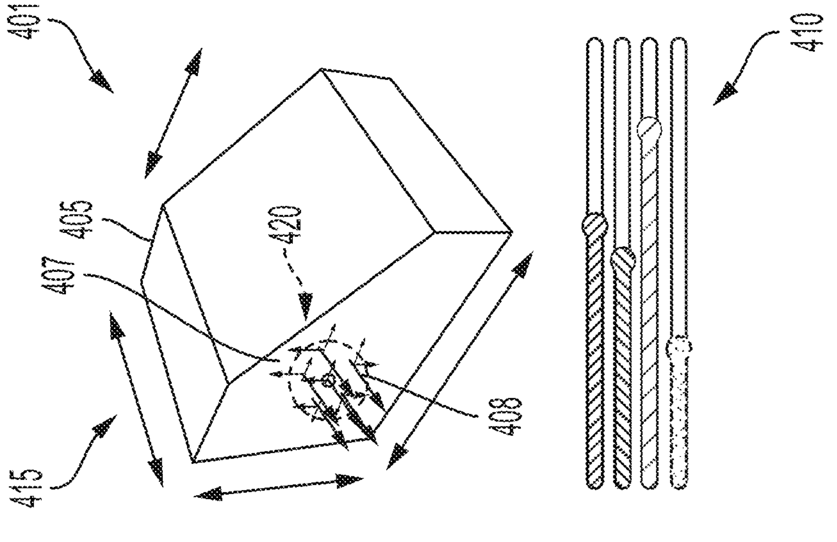

FIGS. 4A-4C illustrate one example of determining a transformation that relates a computed position to the one or more parameters, according to some aspects of the present disclosure. The example transformations can involve computing a mathematical relationship between the spatial rate of change of the 3D surface in the coordinate system of the composite 3D shape to the rate of change of at least one parameter. In particular, FIGS. 4A-4C depict the determination of a Jacobian operator, according to some aspects of the present disclosure.

In FIG. 4A, the extraction 401 of Jacobian information using an end-to-end forward differentiated point evaluation function is depicted. The shape 405 is an example of a composite 3D shape including a number of implicitly defined 3D primitives. The implicit definitions can include parameters 415 which can be adjusted, in some examples, using sliders 410 as may be provided in the UI of some 3D graphics editing software implementations. Point 407 is selected for direct manipulation using a suitable input method or device. In some examples, point 407 includes a number of additional sampled points in a brush extent 408. In that case, the Jacobian matrix determination described below is performed for each sampled point.

A Jacobian operator or matrix that relates the spatial rate of change of the 3D surface in the coordinate system of the composite 3D shape to the rate of change of at least one parameter at the point 407 can be determined using the enriched DAG 275 described with respect to FIG. 2C. For example, the composite SDF at each node of DAG 275 may be differentiable with respect to the parameters of the constituent 3D primitives. Given this requirement that DAG 275 is end-to-end differentiable, forward-mode automatic differentiation can be used to determine an intermediate Jacobian calculation at each node. Automatic differentiation may involve iterative calculation of derivatives by systematically applying the chain rule. At output node 297, the 3D Jacobian operator for the selected point 407 can be represented using a 3×N matrix, where N is the number of parameters used in the various SDFs of the constituent implicitly defined 3D primitives.

In some examples, automatic differentiation of DAG 275 is affected using a suitable software framework. For instance, the TinyAD library can be used to evaluate the Jacobian using a forward-mode automatic differentiation. TinyAD or any other suitable framework can be used to perform the various operations executed by the nodes of DAG 275 to compute the output 297 as well as components of the Jacobian matrix as the DAG 275 is traversed, resulting in an overall Jacobian matrix associated with the input coparametrization 277 derived using the chain rule. A non-limiting list of example frameworks that may be used in addition to or in lieu of TinyAD can include TensorFlow, PyTorch, and JAX.

In FIG. 4B a normalization and filtering procedure 402 is applied to the Jacobian matrices extracted in FIG. 4A. Normalization may be required in cases where the parameters used among the various 3D primitives constituting the composite 3D shape have different units, which can make comparisons between the computed Jacobian operators with respect to different parameters meaningless. In some examples, normalization is performed following generation of the enriched DAG 275 and rendering of the composite 3D shape using DAG 200. In some examples, normalization is performed using normalization factors computed as the composite 3D shape is rendered.

In one example normalization method, a set of randomly sampled points (these may be referred to as normalization points to distinguish them from the points associated with the user input) from the composite 3D shape can be selected. As with the point associated with the user input, an alternative representation of the normalization point is determined (normalization alternative representations). Then, using DAG 275, a Jacobian matrix relating the spatial rate of change of the 3D surface in the coordinate system of the composite 3D shape to the rate of change of each of the parameters at the point can be computed (normalization Jacobian matrices). For the Jacobian matrix computed for each randomly sampled point, a norm for each column of each Jacobian matrix can be determined, in which each column corresponds to a parameter while each row correspond to a spatial direction (e.g., x, y, or z). The norm may be, for example, a measure of the magnitude of the vectors represented by the columns. A maximum magnitude for each parameter can be determined, associated with the largest computed norm. The maximum magnitude for each parameter can be used as a normalization factor. The normalization factor associated with each parameter can be used to rescale the columns of the currently computed Jacobian matrices. In some examples, the normalization factors are periodically recomputed and updated, to account for possible variations in the calculated normalization factors due to parameter changes.

The normalized Jacobian operators for the selected points can be filtered to generate a single Jacobian vector for each parameter component. In some examples, a number of points inside the extent of the brush size selected by the user are selected in addition to the point selected by the user. The DAG 275 can determine a Jacobian matrix for each point inside the brush extent. After normalization, the Jacobian information for each point can be merged together into a single matrix by computing the average value for each position in the 3×N Jacobian matrix, corresponding to a component of the spatial differential and the parameter differential in the vicinity of the selected point. The averaged Jacobian matrix may still be a 3×N Jacobian matrix.

At FIG. 4C, a reduction process 403 can be applied to the averaged Jacobian matrix to extract further information to improve the extent to which the system response matches the user intent. For example, the number of parameters that are updated during an edit can be reduced such that the parameters that are updated better match the actual user intent. This process may be referred to as Jacobian reduction. Following normalization and the filtering/averaging process described with respect to FIG. 4B, the elements of the filtered/averaged Jacobian matrix can be compared to determine elements with low values relative to the remaining values. For example, a predefined threshold value such as 5-10% of the normalized Jacobian element with the highest value can be used as a predefined threshold.

In some examples, a statistical analysis of the elements of the filtered/averaged Jacobian matrix is used to select significant components. For example, a predefined threshold value corresponding to a low standard deviation predefined threshold can be used as the discriminator to select Jacobian elements to use for updating parameters. For example, parameters with a high standard deviation may correspond to unpredictable behavior upon modification, which may indicate that they are not the ones intended by the user to be updated. For example, a predefined threshold value such as 20% of 1 standard deviation can be used as a predefined threshold value.

Other techniques may be used during reduction process 403 in addition to the examples discussed above. For example, some reduction methods may include techniques that incorporate information about the movement of the mouse associated with the user input. By comparing the degree of similarity between an element of the filtered/averaged Jacobian matrix and a characteristic of the mouse movement, elements for which the degree of similarity value is low could be discarded.

As a result of the reduction process 403, the Jacobian information is reduced to limit the parameter updates to the most "expressive" dimensions that may correspond to the user selection and intent. In the illustration shown in FIG. 4C, the magnitude of the Jacobian matrix elements corresponding to the height and depth of the 3D shape 405 is lower that the elements corresponding to the width. As a result, the elements of the filtered/averaged Jacobian matrix in the directions corresponding to height and depth are discarded in favor of the elements corresponding to the width, resulting in reduced Jacobian 430. Reduced Jacobian 430 may be more likely to represent the user intention associated with the user input.

Parameter Update Determination

Figure 5:
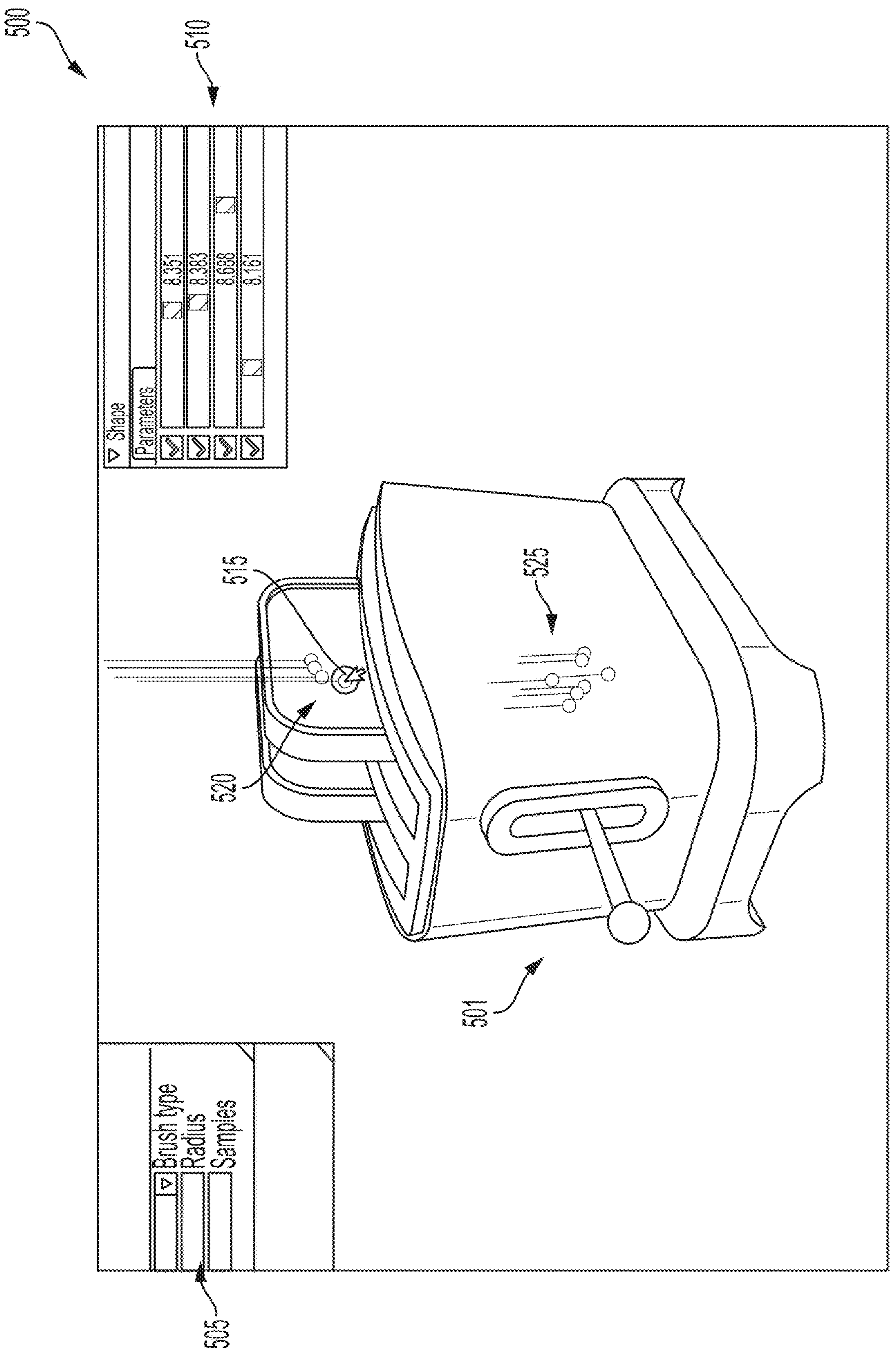
FIG. 5 is an illustration of a user interface showing a composite 3D shape undergoing direct manipulation, according to some aspects of the present disclosure.

FIG. 5 is an illustration of a user interface 500 showing a composite 3D shape 501 undergoing direct manipulation, according to some aspects of the present disclosure. Shape 501 is a toaster that is a complex 3D composite shape assembled from a variety of 3D implicitly defined primitives. User interface 500 includes controls 505 that can be used to select configurations relating to the user input. For example, controls 505 may include selectors for brush type, brush size, or number of points to sample within the brush extent. These non-limiting example controls 505 are provided for illustration and may vary among user interface 500 implementations.

The brush extent, or simply extent, in the general context of a user interface tool (e.g., pointer, spray paint, pencil, line drawer, etc.) includes an area or virtual volume associated with the user interface tool. For example, a brush tool may be drawn with a circle or virtual sphere surrounding the pointer (e.g., the mouse location) or other designated point. The extent indicates the range of points that may be sampled in the extent. The number of points sampled may be separately configurable.

User interface includes sliders 510 that can be used for direct adjustment and updating of the parameters included in the implicit definition of the composite 3D shape 501. For example, the sliders 510 may correspond to parameters included in the SDFs of the constituent 3D primitives or parameters relating to the transformations affected during assembly of the composite 3D shape 501, among others. In some examples, the sliders 510 are actuated to modify the composite 3D shape 501 or the shape 501 can be directly manipulated. The two methods for editing shape 501 can be used in combination or separately.

A user can select point 515 using a suitable input device. For example, point 515 can be selected using a mouse or a finger on a touchscreen. In this example, the user drags up following selection of point 515, which can indicate an intent for the bread slice to move up. The visual indicators 520 can represent the surrounding points selected as well as the components of the calculated Jacobians used to determine parameter updates. As the user drags the input up, the bread slice can move up as the parameter updates are computed and the associated parameters are updated in near-real-time.

In some examples, fixed points 525 can be selected separately from point 515. Fixed points 525 can be selected to indicate fixed points in the 3D shape that should not move or otherwise be altered during the direct manipulation. Fixed points 525 illustrate the capability of some example implementations to constrain both moving (point 515) and non-moving points (fixed points 525) during a direct manipulation. The lines shown in association with fixed points 525 are a visualization of the Jacobian vectors computed for the fixed points. In some examples, the vectors associated with fixed points 525 may be shown as in FIG. 5, for illustrative purposes.

Parameter updates can be computed using the reduced Jacobian matrix determined as described above with respect to FIG. 4C. The parameter update may correspond to the $\Delta\pi$ that minimizes the distance between the position of the selected point $p_i$ and the "target" position T. The target position T may be the point where the user input ends, as evidenced by, for example, the user releasing the mouse button or lifting a finger from the touchscreen.

Formally, for a parametric composite 3D shape 501 defined as a function $\varphi:\Pi\rightarrow\mathcal{S}$ that can generate each element of a class of shapes s $\Im\mathcal{S}$ according to parameter values $\pi\in\Pi$, the minimization problem is given by:

$$\text{argmin}_{\pi'} = \|C^{-1}(\pi', c_i) - T\|$$

in which $\pi'=\pi+\Delta\pi$, $c_i$ is the coparametrization of the selected point 515, and $C^{-1}(\pi', c_i)$ is the inverted bijective mapping of the coparametrization determined using a position evaluation function such as DAG 275. $\text{argmin}_{\pi'}$ can correspond to the value of $\pi'$ that yields the minimum value of $\|C^{-1}(\pi, c_{=i})-T\|$. The evaluation of $C^{-1}(\pi', c_i)$ can be approximated by $C^{-1}(\pi', c_i)+J_i\cdot\Delta\pi$, in which $C^{-1}(\pi, c_i)$ is the position of the currently selected point $p_i$ and $J_i$ is the filtered and reduced Jacobian matrix at $p_i$.

The term $J_i$ is expressed in the coordinate system of the composite 3D shape 501 and not the coordinates of the 2D plane that the user input is expressed in (e.g., the 2D coordinates of a laptop monitor or touchscreen). The Jacobian matrix $J_i$ can be projected into the 2D plane of the user input before comparing it to the user input stroke information in this step. The Jacobian matrix $J_i$ projected into the 2D plane of the user input using a projection function can be written as $J_i'$. The projection function can be any suitable differentiable function such as a perspective or orthographic projection.

The minimization problem can be rewritten as $$\|(p_i - T) + J_i' \cdot \Delta\pi\| = 0$$

where $\Delta T=(p_i-T)$ represents the magnitude of the user input (e.g., the distance in 2D screen coordinates between the point 515 and the release of the mouse) and $$J_i' = J_{proj} \cdot J_i.$$

The desired values of $\Delta\pi$ can thus be computed as $$\Delta\pi = J_i'^{+} \cdot \Delta T$$

in which $$J_i'^{+}$$

is a pseudo-inverse of $$J_i'.$$

The pseudo-inverse of a matrix may be a generalization of the matrix inverse for non-square matrices, such as the 3×N Jacobian constructed above. The pseudo-inverse may be calculated using, for example, singular value decomposition.

The steps described above may be used for both points that are edited by a user input as well as for points that are fixed (e.g. a rigid body that should not be distorted). In the latter example, the target value T can be replaced by the displacement of the fixed points. In addition to the solving strategy described with respect to FIG. 5, additional solving strategies could be used that work by exploiting the same Jacobian information, such as a gradient descent method.

Method for Direct Manipulation of Implicitly Defined Digital 3D Shapes

Figure 6:
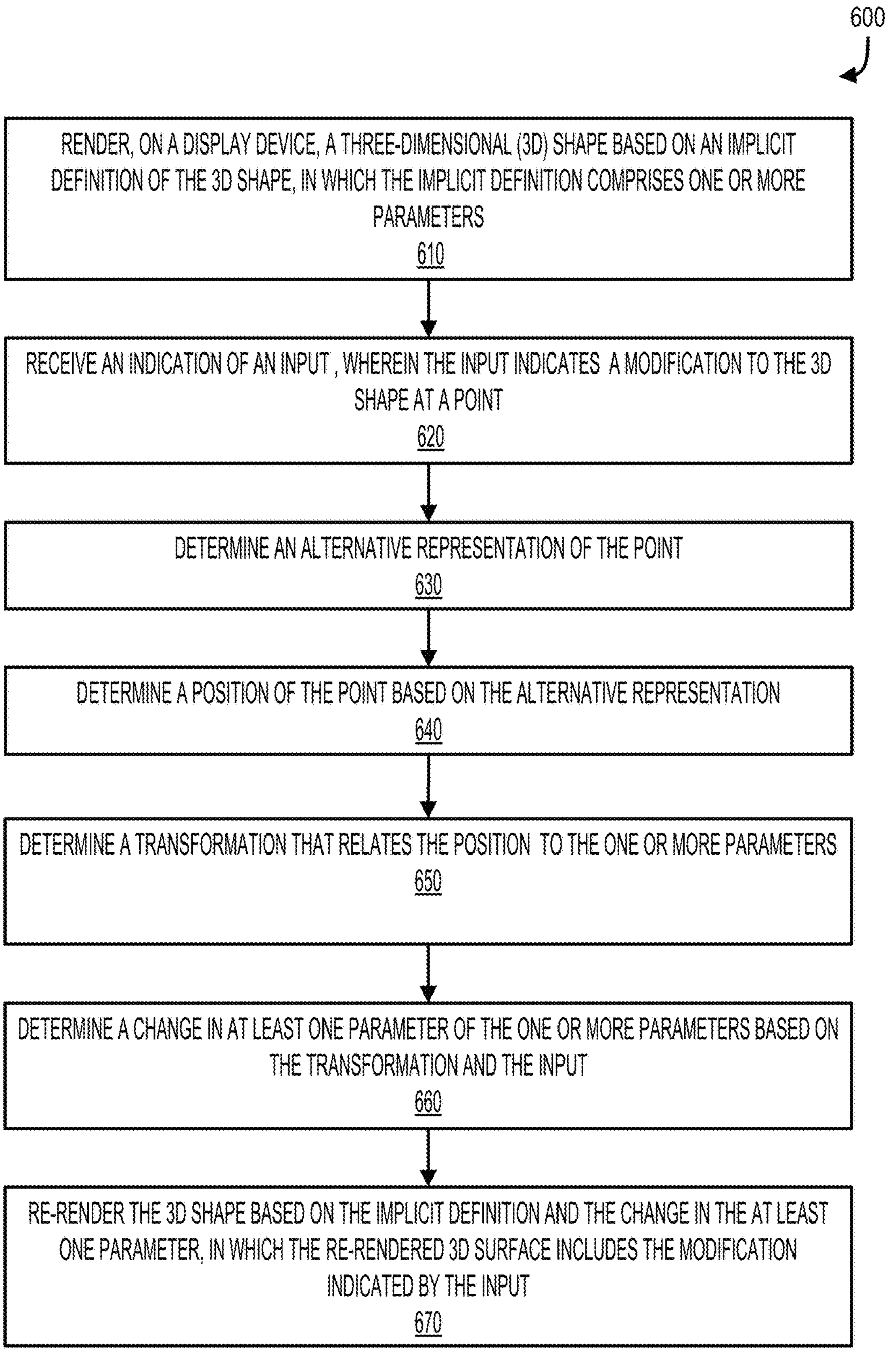
FIG. 6 is a flow diagram of an example process for direct manipulation of implicitly defined digital 3D shapes, according to some aspects of the present disclosure.

FIG. 6 is a flow diagram of an example process 600 for direct manipulation of implicitly defined digital 3D shapes, according to some aspects of the present disclosure. The process 600 depicted in FIG. 6 may be implemented in software executed by one or more processing units of a processing device, implemented in hardware, or implemented as a combination of software and hardware. This process 600 is intended to be illustrative and non-limiting. The example process herein is described with reference to the shape modification system 110 depicted in FIG. 1, but other implementations are possible. Although FIG. 6 depicts various processing operations occurring in a particular order, the particular order depicted is not required. In certain alternative embodiments, the processing may be performed in a different order, some operations may be performed in parallel, or operations may be added, removed, or combined together.

At block 610, a computing system such as the shape modification system 110, renders, on a display device, a composite 3D shape based on an implicit definition of the 3D shape including one or more parameters. The implicit definition may include a procedural method for assembling the composite 3D shape using a number of implicitly defined 3D primitives. The implicit definitions of the 3D primitives may be, for example, SDFs. The procedural method, such as a DAG, may include instructions for combining the SDFs of the 3D primitives to make compound SDFs. For example, the union of two spheres defined using SDFs may be written as the minimum value of the two SDFs at each point in space.

Each SDF as well as composite SDFs may include a number of parameters. In the example of two spheres, parameters may include, for example, the radii of the spheres or the coordinates of the center of the spheres. In some examples, the composite 3D shape is shown along with user interface controls such as sliders that can be used to manipulate the composite 3D shape after it has been rendered. For the two spheres example, one slider could be provided whose position is proportional to the radius of each associated sphere. A third slider may correspond go the displacement of one sphere from the center of the other. Users can adjust the positions of the sliders to fine-tune the composite 3D shape.

This method for adjusting the details of the composite 3D shape may be inadequate when the composite 3D shape is sufficiently complex (e.g., dozens of sliders). Direct manipulation of the composite 3D shape can provide a more intuitive, easier-to-use user experience. At block 620, the computing system receives an indication of an input indicating a modification to the composite 3D shape at a point. In the two spheres example, the user may press a finger to the surface of one sphere at a point shown on a touchscreen interface and drag outwards, indicating an intent to increase the size of the sphere. A variety of UI tools may be available for providing the input including sketch tools, brushes, arrows, and so on. In some examples, the indication is a line drawn on the surface of the composite 3D shape.

At block 630, the computing system determines an alternative representation of the point. For example, one alternative representation of the point is known as a "coparametrization." The coparametrization can be used to characterize points on the composite 3D shape before and after editing using certain unchanging, uniquely identifying identifiers. In some examples, the coparametrization for each point is determined while the composite 3D shape is being rendered, which can reduce the computational load on the computing system during direct manipulation of the composite 3D shape.

In some examples, the coparametrization includes one or more coordinates in a canonical coordinate system of at least one 3D primitive of the 3D primitives making up the composite 3D shape and unique identifier. The canonical coordinates may refer to the coordinate system of the 3D primitives as used in the respective SDFs. In some cases, the canonical coordinate system may be transformed during the assembly of the composite 3D shape. For example, a displacement or comparable transformation may displace the canonical coordinate system.

In some examples, the identifier corresponds to a path from a source node of the DAG to a sink node of the DAG. For example, as described above with respect to FIGS. 2B and 2C, the identifier associated with a particular node may be determined by incrementing a pid value by an amount based on the number of paths that flow into the node. Incrementing the identifier can ensure that every path is uniquely identified by a pid value such that it is possible to identify the sequence of operations that resulting a particular coparametrization.

At block 640, the computing system determines a position of the point based on the alternative representation. For example, the DAG 275 of FIG. 2C can be used as a position evaluation function to output the position of the selected point (and surrounding points) in the coordinate system of the composite 3D shape. The DAG 275 or other comparable position evaluation function can be used to recover the 3D coordinates of the rendered composite 3D shape.

At block 650, the computing system determines a transformation that relates the alternative representation to the one or more parameters. For example, the transformation may be a Jacobian matrix or similar differential operator that relates spatial rates of change of the 3D components of the position to the rate of change of the parameters in parameter space.

At block 660, the computing system determines a change in at least one parameter of the one or more parameters based on the transformation and the input, as described in detail with respect to FIG. 5 above. For example, computation of the change may begin with determining a magnitude of the input such the length of a gesture or mouse movement. Because the user input is provided onto a 2D surface such as a touchscreen, a 2D projection of the Jacobian matrix can be determined. Next, the pseudo-inverse of the projected Jacobian matrix can be determined. The pseudo-inverse matrix can be used to compute the change in the at least one parameter by multiplying the pseudo-inverse Jacobian matrix by the magnitude of the input. Other approaches to determining the change can be used such as gradient descent methods.

At block 670, the computing system re-renders the 3D shape based on the implicit definition and the change in the at least one parameter, in which the re-rendered 3D shape includes the modification indicated by the input. For example, the change in the at least one parameter can be applied to the SDFs defining the composite 3D shape, similarly to how they would be applied if input using sliders. The rendering engine 120 can re-render the composite 3D shape based on the modified parameter values. In some examples, the change in the at least one parameter is applied to the underlying DAG, thus affecting a permanent, unparametrized change to the composite 3D shape.

In some examples, the computing system may receive a second input indicating a fixed point on the 3D shape, as shown in fixed points 525 with respect to FIG. 5 above. The change in parameter values based on the computed Jacobians and user input can be further based on the second input of the fixed point. The fixed point can thus be used during the computation of the change in parameter values to denote unchanging points in the coordinate system of the composite 3D shape. Likewise, re-rendering the composite 3D shape is also based on the fixed point.

In some examples, the manipulation causes the composite 3D shape to be updated in near-real-time. In some examples, a representation of the change in the at least one parameter is output to the user interface along with the re-rendered composite 3D shape. For example, the representation may be a movement in a position of a user interface slider control corresponding to the respective parameter. The sliders may thus reflect the slider displacement that would have caused the modification in the re-rendered composite 3D shape.

Computing Environment

Figure 7:
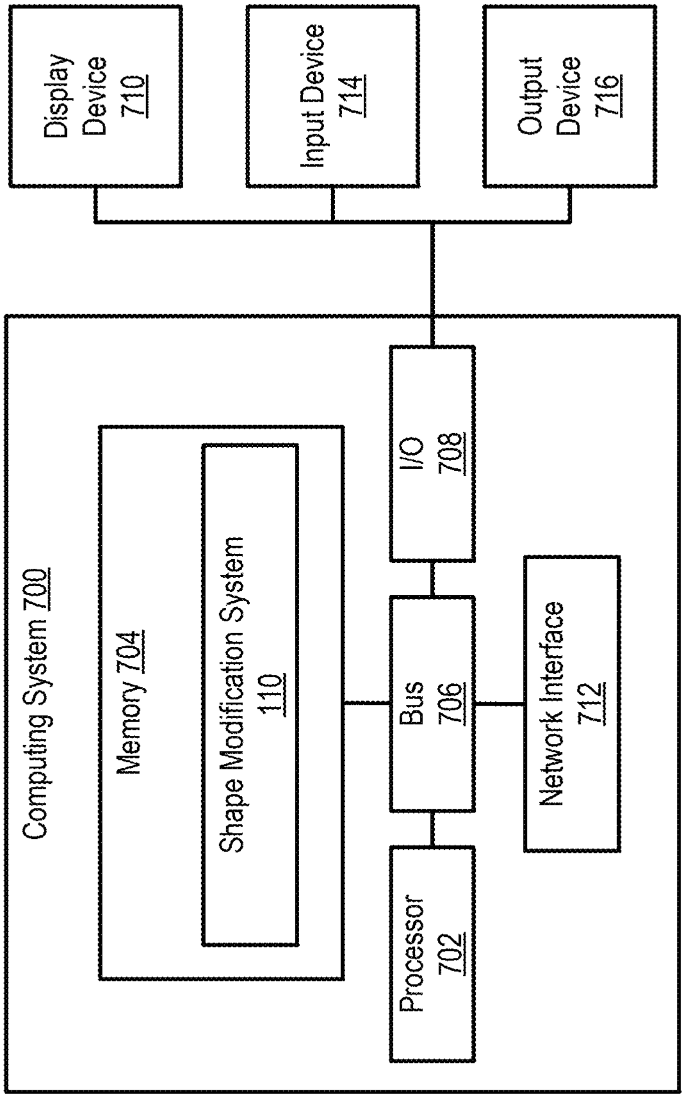
FIG. 7 depicts an example of a computer system that may be suitable for directly manipulating implicitly defined digital 3D shapes, according to certain embodiments.

Any suitable computer system or group of computer systems can be used for performing the operations described herein. For example, FIG. 7 depicts an example of a computer system 700. The depicted example of the computer system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 704 can be volatile memory, non-volatile memory, or a combination thereof.

The computer system 700 executes program code 707 that configures the processor 702 to perform one or more of the operations described herein. Examples of the program code 707 include, in various embodiments, the shape modification system 110 described in FIG. 1, which may include any other suitable systems or subsystems that perform one or more operations described herein (e.g., one or more ML models, storage systems, controllers, or function-specific modules). The program code 707 may be resident in the memory device 704 or any suitable computer-readable medium and may be executed by the processor 702 or any other suitable processor.

The processor 702 is an integrated circuit device that can execute the program code 707. The program code 707 can be for executing an operating system, an application system or subsystem, or both. When executed by the processor 702, the instructions cause the processor 702 to perform operations of the program code 707. When being executed by the processor 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 704 store the program code 707 that includes one or more datasets described herein. In some embodiments, one or more of data sets are stored in the same memory device (e.g., one of the memory devices 704). In additional or alternative embodiments, one or more of the programs, data sets, models, and functions described herein are stored in different memory devices 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, an output device 717, or other input or output devices. For example, the computer system 700 is shown with one or more input/output ("I/O") interfaces 708. An I/O interface 708 can receive input from input devices or provide output to output devices. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. An output device 717 can include any device or group of devices suitable for providing visual, auditory, or other suitable sensory output. Non-limiting examples of the output device 717 include a touchscreen, a monitor, a speaker, a separate mobile computing device, etc.

Although FIG. 7 depicts the input device 714 and the output device 717 as being local to the computer system 700, other implementations are possible. For instance, in some embodiments, one or more of the input device 714 and the output device 717 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

General Considerations

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing devices, comprising:

rendering, on a display device, a three-dimensional (3D) shape based on an implicit definition of the 3D shape, wherein the implicit definition comprises one or more parameters;

receiving an indication of an input, wherein the input indicates a modification to the 3D shape at a point, the point comprising a first position in 3D space;

determining a coparametrization of the point, the coparametrization comprising: (1) canonical coordinates of the point relative to at least one 3D primitive of the one or more 3D primitives and (2) an identifier corresponding to a path traversed through a first procedural function representing the implicit definition;

determining a second position of the point in 3D space comprising evaluating a second procedural function representing the implicit definition configured to receive the coparametrization as input and to output the second position of the point in 3D space by propagating the canonical coordinates of the coparametrization of the point through nodes of the second procedural function and determining the second position corresponding to a zero-valued identifier;

determining a transformation that relates the second position to the one or more parameters;

determining a change in at least one parameter of the one or more parameters based on the transformation and the input; and re-rendering the 3D shape based on the implicit definition and the change in the at least one parameter, wherein the re-rendered 3D shape includes the modification indicated by the input.

2. The method of claim 1, further comprising outputting a representation of the change in the at least one parameter, wherein the representation comprises a movement in a position of a user interface slider control.

3. The method of claim 1, wherein the first procedural function and the second procedural function are first directed acyclic graph (DAG) and second DAG, respectively.

4. The method of claim 3, wherein:

the implicit definition includes one or more 3D primitives, wherein each 3D primitive of the one or more 3D primitives comprises a canonical coordinate system; and each DAG comprises one or more source nodes, wherein each of the one or more 3D primitives is represented by a primitive source node of the one or more source nodes.

5. The method of claim 4, wherein the identifier corresponds to a path from a source node of each DAG to a sink node of each DAG.

6. The method of claim 4, wherein each 3D primitive of the one or more 3D primitives is defined using a signed distance function (SDF).

7. The method of claim 4, wherein the transformation that relates the coparametrization to the one or more parameters is a Jacobian matrix.

8. The method of claim 7, wherein:

the second DAG is end-to-end differentiable; and determining the transformation that relates the coparametrization to the one or more parameters comprises applying forward mode automatic differentiation of a subset of the nodes in the second DAG.

9. The method of claim 1, wherein the input defines an extent and further comprising:

determining one or more additional points within the extent, and further comprising:

for each of the one or more additional points, determining an additional alternative representation of the additional point;

for each of the additional alternative representations of the one or more additional points, determining an additional position of the point based on the additional alternative representation;

for each of the additional positions, determining an additional transformation that relates the additional position to the one or more parameters;

wherein determining the change in the at least one parameter of the one or more parameters based on the transformation is further based on the additional transformations; and wherein the additional transformations that relate the additional alternative representations to the one or more parameters are Jacobian matrices.

10. The method of claim 9, wherein determining the change in the at least one parameter of the one or more parameters based on the transformations comprises:

determining a set of normalization points;

for each normalization point of the set of normalization points, determining a normalization alternative representation of the normalization point;

for each of the normalization alternative representations of the set of normalization points, determining a normalization position of the point based on the normalization alternative representation;

for each of the normalization positions, determining a normalization Jacobian matrix that relates the normalization position to the one or more parameters;

computing a norm of each column of the normalization Jacobian matrices, wherein each column is associated with a parameter of the one or more parameters;

determining a maximum norm associated with the one or more parameters; and normalizing each column of the respective Jacobian matrix using the maximum norm for each respective column.

11. The method of claim 9, wherein determining the change in the at least one parameter of the one or more parameters based on the transformations further comprises:

generating a filtered Jacobian matrix by combining the Jacobian matrices using an aggregate operation; and generating a reduced Jacobian matrix by zeroing one or more elements of the reduced Jacobian matrix with magnitudes less than a predefined threshold.

12. The method of claim 11, wherein determining the change in the at least one parameter of the one or more parameters based on the transformations further comprises:

determine a magnitude of the input;

computing a two-dimensional projection of the filtered Jacobian matrix;

computing a pseudo-inverse Jacobian matrix of the two-dimensional projection of the filtered Jacobian matrix; and computing the change in the at least one parameter by multiplying the pseudo-inverse Jacobian matrix by the magnitude of the input.

13. The method of claim 1, further comprising receiving a second indication of a second input, wherein:

the second input indicates a fixed point on the 3D shape;

the change in the at least one parameter of the one or more parameters based on the transformation and the input is further based on the second input;

re-rendering the 3D shape is further based on the fixed point; and the re-rendered 3D shape further includes the fixed point, the location of the fixed point being unchanged by the transformation.

14. The method of claim 1, wherein determining the second position corresponding to the zero-valued identifier comprises:

at each node of the second procedural function, decrementing the identifier of the coparametrization by an amount based on a number of paths traversed through the node; and designating the output of the node for which the identifier reaches zero upon decrementing as the second position.

15. A system comprising:

one or more processors; and one or more computer-readable storage media storing instructions which, when executed by the one or more processors, cause the one or more processors to perform operations including:

rendering, on a display device, a 3D shape based on an implicit definition of the 3D shape, wherein the implicit definition comprises one or more parameters;

receiving a selection on a first area on the 3D shape, the first area including one or more points;

for each point of the one or more points:

determining a coparametrization of the point, the coparametrization comprising: (1) canonical coordinates of the point relative to at least one 3D primitive of the one or more 3D primitives and (2) an identifier corresponding to a path traversed through a first procedural function representing the implicit definition;

determining a position using a second procedural functional comprising an end-to-end differentiable position evaluation function configured to receive the coparametrization as input and to output the position by propagating the canonical coordinates of the coparametrization of the point through nodes of the second procedural function and determining the position corresponding to a zero-valued identifier; and determining, based on the position, Jacobian information for the position with respect to the one or more parameters;

generating a Jacobian matrix based on the Jacobian information for the positions for the one or more points;

receiving an indication of a stroke beginning at the first area and ending at a second area;

determining an update to at least one of the one or more parameters based on the stroke and the Jacobian matrix; and re-rendering the 3D shape based on the implicit definition and the update to at least one of the one or more parameters.

16. The system of claim 15, wherein the first procedural function and the first procedural function are DAGs including one or more 3D primitives defined using an SDF.

17. The system of claim 15, wherein generating the Jacobian matrix based on the Jacobian information for the positions for the one or more points comprises:

generating a filtered Jacobian matrix by combining the Jacobian information for the positions for the one or more points using an aggregate operation; and generating a reduced Jacobian matrix by zeroing one or more elements of the reduced Jacobian matrix with magnitudes less than a predefined threshold.

18. A non-transitory computer-readable medium storing instructions that, when executed by one or more processors, cause the one or more processors to perform operations including:

rendering, on a display device, a 3D shape based on an implicit definition of the 3D shape, wherein the implicit definition comprises one or more parameters;

receiving an indication of an input, wherein the input indicates a modification to the 3D shape at an area on the 3D shape comprising one or more points;

a step for determining a coparametrization of the one or more points, the coparametrization comprising (1) canonical coordinates of the point relative to at least one 3D primitive of the one or more 3D primitives and (2) an identifier corresponding to a path traversed through a first procedural function representing the implicit definition;

a step for determining a position for each coparametrizations of the one or more points comprising evaluating a second procedural function representing the implicit definition configured to receive each coparametrization as input and to output the position of each point by propagating the canonical coordinates of the coparametrization of the point through nodes of the second procedural function and determining each position corresponding to a zero-valued identifier;

a step for determining Jacobian matrices that relate the coparametrization to the one or more parameters;

a step for determining a change in at least one parameter of the one or more parameters based on the Jacobian matrices and the input; and re-rendering the 3D shape based on the implicit definition and the change in the at least one parameter, wherein the re-rendered 3D shape includes the modification indicated by the input.

19. The non-transitory computer-readable medium of claim 18, wherein the first procedural function and the second procedural function are DAGs including one or more 3D primitives defined using an SDF.

20. The non-transitory computer-readable medium of claim 18, wherein the step for determining the Jacobian matrices that relate the coparametrization to the one or more parameters comprises:

normalizing each Jacobian matrix using a normalization technique;

generating a filtered Jacobian matrix by combining the Jacobian matrices using an aggregate operation; and generating a reduced Jacobian matrix by zeroing one or more elements of the reduced Jacobian matrix with magnitudes less than a predefined threshold.

* * * * *